(12) United States Patent
Bejeryd et al.

(10) Patent No.: US 9,689,673 B2
(45) Date of Patent: Jun. 27, 2017

(54) TARGET DETERMINING METHOD AND SYSTEM

(71) Applicant: SAAB Vricon Systems AB, Linkoeping (SE)

(72) Inventors: Johan Bejeryd, Linkoeping (SE); Manne Anliot, Linkoeping (SE); Jonas Dehlin, Linkoeping (SE); Leif Haglund, Brokind (SE)

(73) Assignee: SAAB Vricon Systems AB, Linkoeping (SE)

( * ) Notice: Subject to any disclaimer, the term of this patent is extended or adjusted under 35 U.S.C. 154(b) by 4 days.

(21) Appl. No.: 14/363,629

(22) PCT Filed: Apr. 14, 2014

(86) PCT No.: PCT/SE2014/050463
§ 371 (c)(1),
(2) Date: Jun. 6, 2014

(87) PCT Pub. No.: WO2015/160292
PCT Pub. Date: Oct. 22, 2015

(65) Prior Publication Data
US 2015/0292883 A1 Oct. 15, 2015

(51) Int. Cl.
*G01C 3/08* (2006.01)
*G01C 15/00* (2006.01)

(52) U.S. Cl.
CPC .................. *G01C 15/002* (2013.01)

(58) Field of Classification Search
CPC ........ G01C 15/002; G01C 3/06; G01C 15/02; G01C 15/04; G01C 17/14; G01C 3/00;
(Continued)

(56) References Cited

U.S. PATENT DOCUMENTS

| 5,825,480 A | 10/1998 | Udagawa |
| 6,064,942 A | 5/2000 | Johnson et al. |

(Continued)

OTHER PUBLICATIONS

International Searching Authority, International Search Report and Written Opinion for International Applications No. PCT/SE2014/050463, Jan. 27, 2015, 9 pages, Swedish Patent and Registration Office, Sweden.

*Primary Examiner* — Luke Ratcliffe
*Assistant Examiner* — Assres H Woldemaryam
(74) *Attorney, Agent, or Firm* — Alston & Bird LLP

(57) ABSTRACT

The present disclosure relates to a method (1) and system for determining the position of a target. The method comprises a step of measuring (110) with a range and direction measuring device the position of at least one reference object relative to the position of the range and direction measuring device. The method further comprises a step of marking (120) the at least one reference object in a geo-referenced three-dimensional map so as to obtain a geo-referenced position of the at least one reference object. The method further comprises a step of measuring (130) with the range and direction measuring device the position of the target relative to the position of the range and direction measuring device. The method further comprises a step of calculating (150) a position of the target based on the measured position of the at least one reference object relative to the position of the range and direction measuring device, based on the measured position of the target relative to the position of the range and direction measuring device, and based on the obtained geo-referenced position of the at least one reference object.

15 Claims, 5 Drawing Sheets

(58) Field of Classification Search
CPC . G01S 5/16; G01S 17/06; G01B 11/03; F41G 3/06
USPC .................................................. 356/20, 5.01
See application file for complete search history.

(56) References Cited

U.S. PATENT DOCUMENTS

| | | | |
|---|---|---|---|
| 7,908,083 B2* | 3/2011 | Peters ..................... | G01C 3/04 342/357.2 |
| 8,049,658 B1 | 11/2011 | Lagonik et al. | |
| 8,275,544 B1 | 9/2012 | Wells et al. | |
| 8,294,958 B2* | 10/2012 | Paterson ............ | G01B 11/2518 358/1.9 |
| 2007/0010965 A1 | 1/2007 | Malchi et al. | |
| 2008/0040036 A1 | 2/2008 | Peters et al. | |
| 2009/0123894 A1* | 5/2009 | Svane .................... | F41G 3/142 434/20 |
| 2009/0323121 A1* | 12/2009 | Valkenburg .......... | G01B 11/002 358/1.18 |
| 2010/0296075 A1* | 11/2010 | Hinderling ............... | G01C 3/08 356/3 |
| 2012/0114254 A1* | 5/2012 | Nakjima ................ | G06K 9/468 382/201 |
| 2012/0124495 A1* | 5/2012 | Amichai ................... | G06F 9/44 715/762 |
| 2012/0232717 A1 | 9/2012 | Koppie | |
| 2012/0292533 A1* | 11/2012 | Ben Shalom .......... | B41M 5/284 250/492.1 |
| 2013/0096873 A1* | 4/2013 | Rosengaus ............ | G01C 15/002 702/151 |
| 2013/0096875 A1* | 4/2013 | Daniel ................ | G01C 15/002 702/159 |
| 2013/0287290 A1* | 10/2013 | Owechko ............. | G06T 17/05 382/154 |
| 2014/0160155 A1* | 6/2014 | Berkovich ............ | H04N 1/387 345/629 |
| 2014/0185927 A1* | 7/2014 | Kawabata ................ | G01J 3/50 382/162 |

* cited by examiner

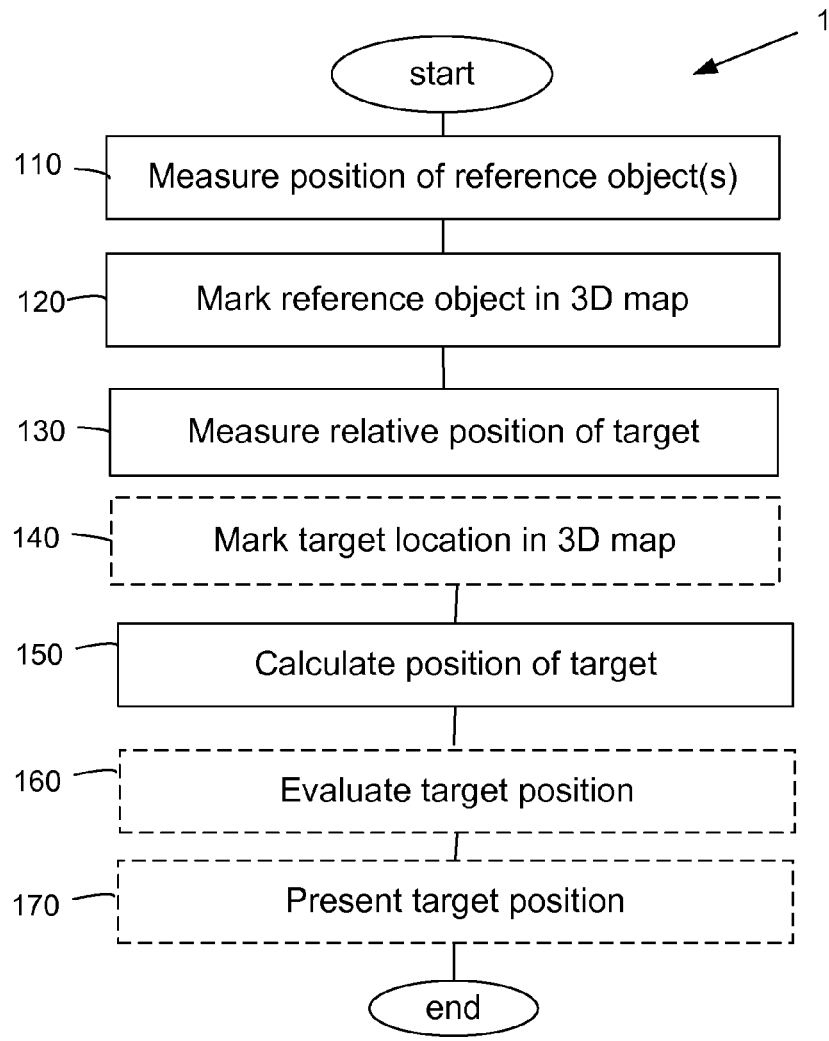
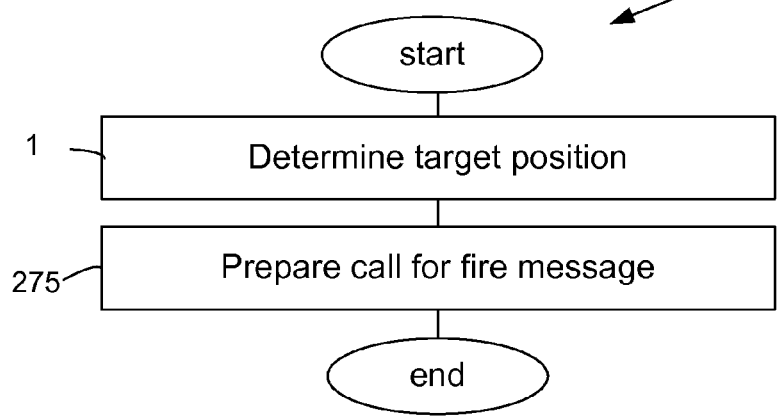

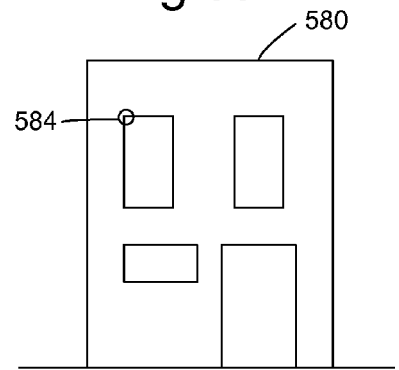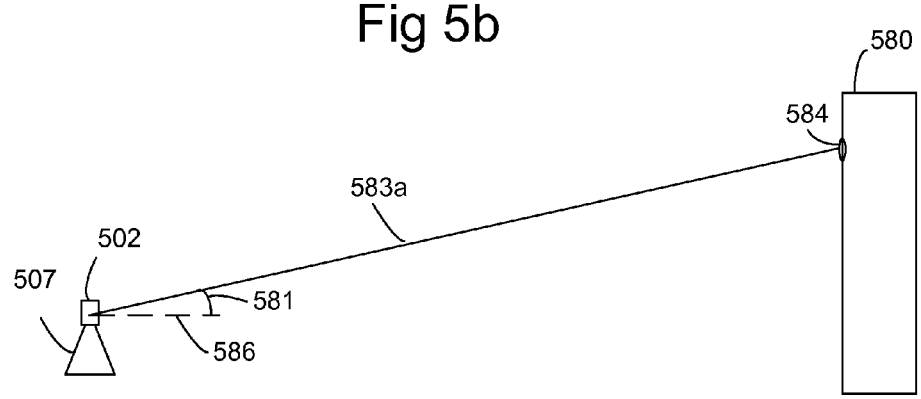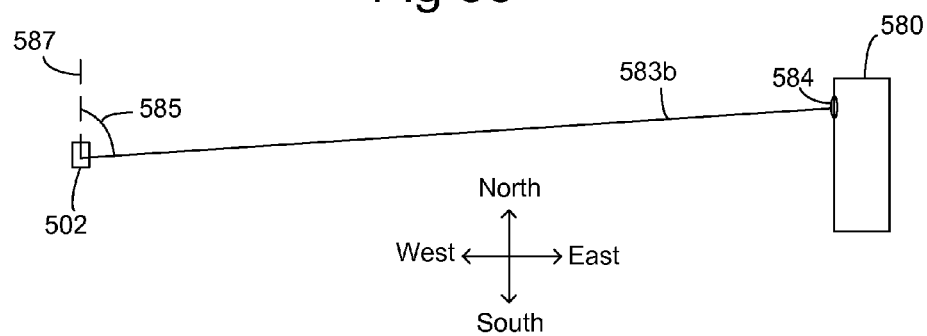

Fig 6a
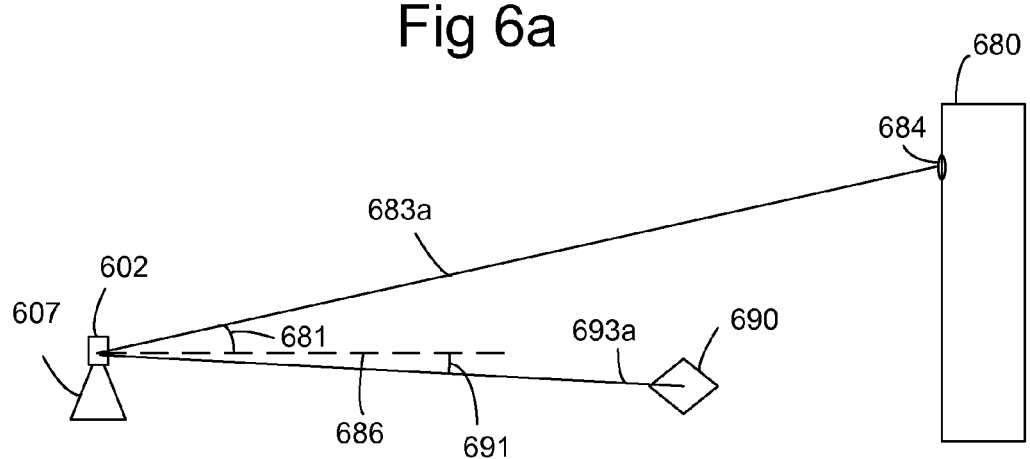
Fig 6b
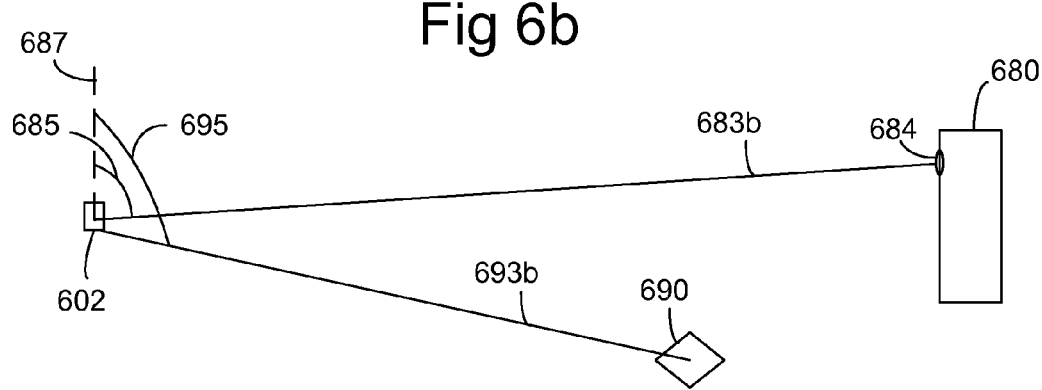
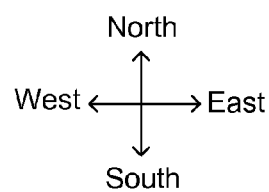

TARGET DETERMINING METHOD AND SYSTEM

CROSS REFERENCE TO RELATED APPLICATIONS

This application is a National Stage Application, filed under 35 U.S.C. §371, of International Application No. PCT/SE2014/050463, filed Apr. 14, 2014, the contents of which are hereby incorporated by reference in their entirety.

BACKGROUND

Related Field

The present disclosure relates to a method and a system for determining the position of a target. It also relates to a method and a system for targeting. It further relates to computer program and a computer program product for determining the position of a target and for targeting.

DESCRIPTION OF RELATED ART

In both military and civilian applications it is often required to find coordinates of a target. In the military area two methods are common today. One method is based on at least a laser rangefinder, LRF, combined with a digital compass and a satellite based positioning system, like the global positioning system, GPS. Exemplary devices for doing this are so called forward observer systems. Devices like this are rather heavy and they often require a time consuming calibration procedure, in the order of 10-15 minutes, especially if high accuracy is needed for target coordinates. Both time and weight might be crucial in the military area since weight limits the equipment a person can carry and time might be a crucial feature for succeeding a mission, especially for an observer to not being detected.

Another method is based on satellite stereo imagery and a manual or semi-automatic process for establishing an elevation coordinate. The satellite images are geo-positioned based on manually surveyed ground control points. This requires man on the ground for the survey. It also requires time consuming manual labor in the back-office for the stereo correlation.

BRIEF SUMMARY

One object of the present disclosure is to present an improved method for determining the position of a target.

This is in one embodiment achieved by means of a method for determining the position of a target. The method comprises a step of measuring with a range and direction measuring device the position of at least one reference object relative to the position of the range and direction measuring device. The method further comprises a step of marking the at least one reference object in a geo-referenced three-dimensional map so as to obtain a geo-referenced position of the at least one reference object. The method further comprises a step of measuring with the range and direction measuring device the position of the target relative to the position of the range and direction measuring device. The above steps may be performed in any order. At least some of the steps may be performed in parallel.

The method further comprises a step of calculating a position of the target based on the measured position of the at least one reference object relative to the position of the range and direction measuring device, based on the position of the target relative to the position of the range and direction measuring device, and based on the obtained geo-referenced position of the at least one reference object.

One advantage with the method above is that a geo-referenced position of the target can be obtained without knowledge of the position of the range and direction measuring device. And thus, the position of an observer using the range and direction measuring device is not needed.

Further, systematic measurement errors are avoided.

Further, if desired, several reference objects can be used.

In one option, the range and direction measuring device comprises a laser range finder.

In one option, the obtained geo-referenced position of the at least one reference object and the calculated geo-referenced position of the target are three-dimensional positions.

In one option, the calculated position of the target is a geo-referenced position.

One embodiment of the present disclosure relates to a method for targeting. The targeting method comprises the steps of determining the position of a target according to the above and preparing a call-for-fire message based on the determined position of the target.

One embodiment of the present disclosure relates to a system for determining the position of a target. The system comprises a 3D map presentation and/or marking device arranged to present a geo-referenced three-dimensional map to a user. The 3D map presentation and/or marking device is further arranged to receive user input and to determine a geo-referenced position of at least one reference object in the three-dimensional map based on the user input. The system further comprises a range and direction measuring device, arranged to measure a position of the at least one reference object and the target relative to the position of the range and direction measuring device. The system further comprises a target position determining unit having input means arranged to receive at least one geo-referenced position of the at least one reference object from the 3D map presentation and/or marking device and to receive the position of the at least one reference object and the position of the target relative to the position of the range and direction measuring device. The target determining unit has further a processor arranged to determine the position of the target based on the received at least one geo-referenced position and the received position of the at least one reference object relative to the position of the range and direction measuring device and the position of the target relative to the position of the range and direction measuring device.

In one option, the range and direction measuring device comprises a laser range finder.

In one option, the range and direction measuring device comprises means for determining at least two angles between the respective object and the range and direction measuring device.

One embodiment of the present disclosure relates to a targeting system comprising a system for determining the position of a target, and means for transferring the determined geo-referenced position of the target.

One embodiment of the present disclosure relates to a program code stored on at least one memory and arranged to execute the method for determining the position of the target as described above. In one example the stored program code can execute the method for targeting. In one example the information stored on the at least one memory comprises information related to the geo-referenced 3D-map. In one example, all information needed by the 3D map presentation and/or marking device for presenting a 3D-map to the observer is stored on the at least one memory.

One embodiment of the present disclosure relates to an apparatus for determining the position of a target. The apparatus comprises a processor and a memory. The memory contains instructions executable by said processor whereby said apparatus is operative to:

measuring with a range and direction measuring device the position of at least one reference object relative to the position of the range and direction measuring device;

marking the at least one reference object in a geo-referenced three-dimensional map so as to obtain a geo-referenced position of the at least one reference object;

measuring with the range and direction measuring device the position of the target relative to the position of the range and direction measuring device; and calculating a position of the target based on measured the position of at least one reference object relative to the position of the range and direction measuring device, based on the measured position of the target relative to the position of the range and direction measuring device, and based on the geo-referenced position of the at least one reference object.

BRIEF DESCRIPTION OF THE FIGURES

FIG. 1 shows a flowchart of one example of a method for determining the position of a target.

FIG. 2 shows a flowchart of one example of a method for targeting.

FIG. 5 shows schematically one example of measurement of one reference object.

FIG. 6 shows schematically one example of measurement of a target.

DETAILED DESCRIPTION OF VARIOUS EMBODIMENTS

Figure 3:
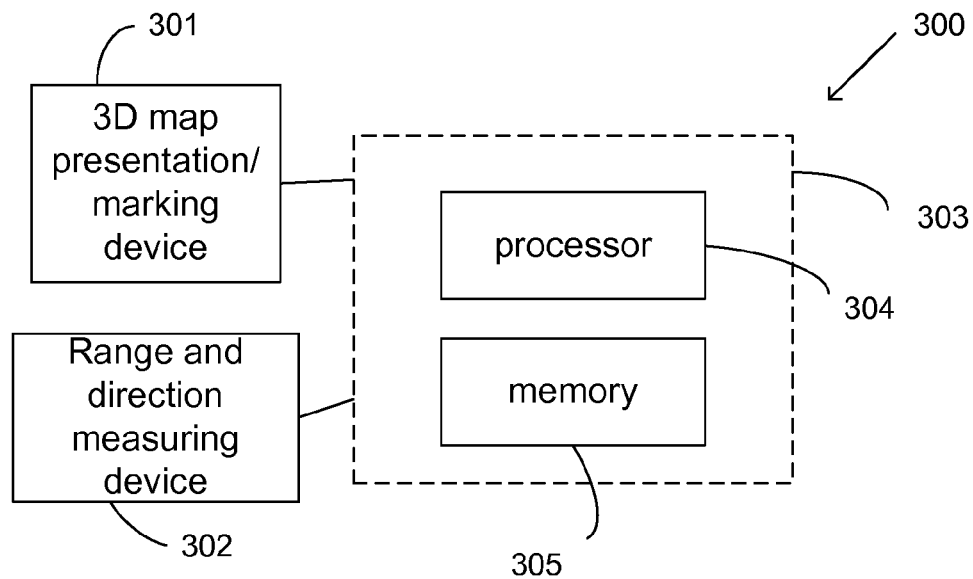
FIG. 3 shows schematically an example of a system for determining the position of a target.

In FIG. 1, an example of a method 1 for determining the position of a target is illustrated. The method comprises a step of measuring 110 with a range and direction measuring device the position of at least one reference object relative to the position of the range and direction measuring device. The method further comprises a step of marking 120 the at least one reference object in a geo-referenced three-dimensional map so as to obtain a position of the at least one reference object. The position is in one example a two dimensional position. The position is in one example a three dimensional position. The position is in one example a position given in a geo-referenced coordinate system. The method further comprises a step of measuring 130 with the range and direction measuring device the position of the target relative to the position of the range and direction measuring device. The steps above may be performed in any order. The steps may be performed in sequence or in parallel.

The method further comprises a step of calculating 150 the position of the target based on the measured position of the at least one reference object relative to the position of the range and direction measuring device, based on the measured position of the target relative to the position of the range and direction measuring device, and based on the obtained geo-referenced position of the at least one reference object.

In detail, the step of measuring 110 the position of at least one reference object relative to the position of the range and direction measuring device so as to obtain a range and a direction to the respective reference object may comprise the following. In one example, the range and direction measuring device comprises a LRF. The LRF is then used for measuring the distance between the LRF and the at least one reference object. The range and direction measuring device is arranged to measures also the direction to the at least one reference object. The range and direction measuring device comprises in one example at least one gyro. In one example the direction between the range and direction measuring device and the at least one reference object comprises two angles. The angles comprise for example an elevation angle and an azimuth angle.

In detail, the step of marking 120 the at least one reference object in a geo-referenced three-dimensional map is made to obtain a geo-referenced position of the at least one reference object through the geo-referenced three-dimensional map. The geo-referenced map is in one example presented to an observer. The observer then marks the at least one reference object on the geo-referenced three-dimensional map. Since the three-dimensional map is geo-referenced, marking a position of at least one reference object on the map enables obtaining the coordinates of the respective reference object. In one example the map is presented on a 3D map presentation and/or marking device. In one example, the marking of the position of the respective reference object is made on the 3D map presentation and/or marking device. In one example the 3D map presentation and/or marking device is wearable. In one example the three dimensional coordinates of the at least one reference object are outputted from the 3D map presentation and/or marking device at marking of the reference object in the 3D map.

The 3D map is easily stored on a wearable 3D map presentation and/or marking device. In one example a 3D-map is transmitted to the 3D map presentation and/or marking device. In one example the wearable 3D map presentation and/or marking device is a handheld device. In one example the handheld device is a mobile phone. In one example the handheld device is a device of comparable size and/or weight of a mobile phone. This reduces size and/or weight substantially compared to prior art solution. In one example the size of the device is slightly bigger than a mobile phone to allow a bigger display.

An observer can start without time-delay to mark the respective reference object on the 3D-map. Further, the process of orienting oneself in a 3D-map goes relatively fast since the observer in general has some pre-knowledge about his/her own position. In one example the observer can zoom in and out on the 3D map. In one example the observer can change an angle of view on a 3D-map. In a preferred example the observer centres the 3D-map on the respective reference object, or at least approximately centres the 3D-map on the respective reference object. In a preferred example the observer adjusts the zoom of the 3D-map so that the 3D-map approximately shows what he/she can see himself/herself when looking in the direction of the respective reference object. In a preferred example the observer adjusts the angle of view on the 3D-map so that it corresponds approximately to the viewing direction the observer himself/herself has to the respective reference object. By performing at least some of the aforementioned preferred examples the observer will see on the 3D-map approximately the same scene as he/she sees in reality. This allows for accurate marking of the position of the at least one reference object.

If a plurality of reference objects are used, the respective measurement 110 is correlated to its associated marked 120 position.

In detail, the step of measuring 130 the position of the target relative to the position of the range and direction measuring device so as to obtain a range and a direction to the target may comprise the following. As described in relation to the reference object measurement, the range and direction measuring device is arranged to measure the range and direction to the target. In one example the direction between the range and direction measuring device and the at least one reference object is described by a plurality of angles. The angles comprise for example an elevation angle and an azimuth angle.

The target is characteristically not incorporated in the 3D-map. The target is for example not incorporated in the 3D map because the target is a movable target or because the target is a stationary target which was constructed only after the 3D-map was constructed. Having the same scene on the device as in reality enables in this case a good and fast marking of the target as well. The method comprises in one optional step marking 140 of the assumed location of the target in the 3D map.

In detail, the step of calculating 150 the position of the target is performed based on the measured position of the at least one reference object relative to the position of the range and direction measuring device, based on the measured position of the target relative to the position of the range and direction measuring device, and based on the obtained geo-referenced position of the at least one reference object.

The target's position relative to the measured at least one reference object is calculated. The target position is in one example described as the position of the reference object plus a range and direction between reference object and the target. In one example, the target position is determined from the position of the reference object and the range and direction between the reference object and the target. If a plurality of reference objects have been used, the range and direction between each reference object and the target is used to provide an average target position. In one example, the influence on the result from the respective reference object is weighted. For example, the weighting can be performed based on the range and/or direction to the target. For example, the target position can be determined based on an averaging of the position obtained using the respective reference object.

In a presentation step 170, the calculated position of the target is presented. In one example, the calculated coordinates of the target are presented by voice. In one example, the calculated coordinates of the target are presented as a text as a text message on a display. In one example, the calculated coordinates of the target are presented in the 3D map together with the coordinate information. In one example the coordinates are transmitted further via the observer. In one example this is done via voice. In one example this is done via typing. In one example the coordinates are transmitted via a transmission device (not shown). In one example the coordinates are transmitted wirelessly for example by radio. Any other type of transmitting can be used as well and it will be understood that the best way of transmitting might depend on the specific circumstances and available communication channels. In one example the coordinates are transmitted to an operator of a call-for-fire procedure. In one example the coordinates are transmitted to a device used in a call-for-fire procedure. In one example the coordinates are transmitted to a target coordinate processing module (this will be described in detail later). Many different call-for-fire procedures are known and it is understood that the target coordinates in principle can be used as input to any of these procedures.

In one example, the calculated target position is evaluated 160. In the illustrated example, the evaluation is made before presentation of the target position. In one example, the evaluation comprises comparing the calculated target position with the manually or semi-automatically marked 140 target location in the 3D map. Alternatively, the evaluation comprises manual inspection of the calculated target coordinate in the 3D map on the 3D map presentation/marking device.

The evaluation comprises in one example determining an uncertainty of the target coordinates. In one example the determination of the uncertainty of the target coordinates is based on an accuracy of the three-dimensional map and/or the observer's understanding of the target location and its vicinity. Further, in one example, the accuracy is determined based on the number of reference objects measured and/or an angular relation between the target and the reference object(s). It is to be understood that a higher accuracy is achieved if the measurements of the reference object(s) and target is performed within angular range of less than 180°, preferably less than 90°. In one example, the measurements of the reference object(s) and target is performed within angular range of less than 45°.

FIG. 2 describes a method 2 for targeting. In a first step, coordinates of a target are determined 1. This is described in relation to FIG. 1. In a second step, the determined coordinates of the target are fed 175 to a call-for-fire procedure. In one example the coordinates are transmitted via the observer, for example via voice and/or typing. In one example the coordinates are transmitted via a transmission device. In one example the target coordinates are transmitted via the 3D map presentation and/or marking device. In one example the target coordinates are transmitted wirelessly for example by radio. Any other type of transmitting can be used as well and it will be understood that the best way of transmitting might depend on the specific circumstances and available communication channels. In one example, target coordinates are transmitted to an operator of a call-for-fire procedure. In one example the target coordinates are transmitted to a device used in a call-for-fire procedure. In one example the target coordinates are transmitted to a target coordinate processing module. Many different call-for-fire procedures are known and it is understood that the target coordinates in principle can be used as input to any of these procedures.

FIG. 3 illustrates a system 300 for determining the position of a target. The system 300 comprises a processor 304 and a memory 305. The memory 305 comprises instructions executable by the processor 304 whereby the system is operative to:

measuring with a range and direction measuring device 302 the position of at least one reference object relative to the position of the range and direction measuring device;

marking the at least one reference object in a geo-referenced three-dimensional map so as to obtain a geo-referenced position of the at least one reference object;

measuring with the range and direction measuring device the position of the target relative to the position of the range and direction measuring device; and calculating the geo-referenced position of the target based on the measured relative positions between the target and the range and direction measuring device, based on the distance(s) between the at least one reference object and the distance-measuring device, and based on the geo-referenced position of the reference object.

In detail, the system comprises a 3D map presentation and/or marking device 301, a range and direction measuring device 302 and a target position determining unit 303.

The 3D map presentation/marking device 301 is arranged to present a geo-referenced three-dimensional map to a user. The device 301 is further arranged to receive user input and to determine a position of an object in the three-dimensional map based on the user input.

The 3D map presentation and/or marking device 301 is in one example wearable. In one example the presented 3D-map is centred on initial coordinates of the target and/or reference object(s). In one example the wearable 3D map presentation and/or marking device 301 is a mobile phone. In one example the wearable 3D map presentation and/or marking device 301 has a similar size as a mobile phone. In one example the 3D map presentation and/or marking device 301 has a touch screen arranged to present the 3D-map to the observer and to receive input from the observer so as to mark a new position of the target. In one example the 3D map presentation and/or marking device 301 comprises input module for receiving input from the observer. In one example the 3D map presentation and/or marking device 301 has a screen of bigger size than ordinary mobile phones for facilitating easier target marking from the observer. In one example the 3D map presentation and/or marking device 301 is arranged to present information to glasses and/or a head-worn display of an observer. The term wearable refers to the possibility of being able to easily transporting the 3D map presentation and/or marking device 301. This means that it is not necessary that the 3D map presentation and/or marking device 301 is stationary at a specific place. It also refers to the fact that the 3D map presentation and/or marking device 301 has the right size and weight to be actually transportable by a human being without any bigger burden, even under longer time.

The 3D map presentation and/or marking device 301 is further arranged to determine coordinates of reference objects based on the marked position of the of the respective reference object. Having a marked position on a geo-referenced 3D-map allows conversion of that position into reference object coordinates. The 3D map presentation and/or marking device 301 comprises memory for the 3D map. In one example the 3D map presentation and/or marking device 301 comprises calculation means, for example a processor (not shown in FIG. 3a).

The 3D map presentation and/or marking device 301 is herein described as one device; however the term "3D map presentation and/or marking device 301" is intended to include all functionality of the 3D map presentation and/or marking device 301 even if not all components are included in the same physical unit.

The range and direction measuring device 302 is arranged to measure a position of an object relative to the position of the range and direction measuring device. The range and direction measuring device comprises in one example a laser range finder, LRF. The range and direction measuring device is arranged to determine a direction from the observer to the measured object. The range and direction measuring device is in one example arranged to determine at least two angles between the object and the range and direction measuring device. The angles are for example azimuth and elevation.

The target position determining unit 303 has an interface (not shown) arranged to receive from the 3D map presentation and/or marking device 301 the geo-referenced two dimensional or three-dimensional position of at least one reference object. The target position determining unit is further arranged to receive at least one first relative position as measured by the range and direction measuring device. Each first relative position relates to a measurement of a reference object. Thus, one first relative position is obtained for each reference object. The target position determining unit is further arranged to receive a second relative position related to a measurement of the target. In one example, the received information for each measurement comprises a range and two angles. The processor 304 of the target position determining unit 303 is arranged to determine the position of the target based on the received at least one geo-referenced position and the received at least one first relative position and the received second relative position.

In one example, the position determining unit 303 is further arranged evaluate the calculated target position. This has been described in relation to FIG. 1.

Figure 4:
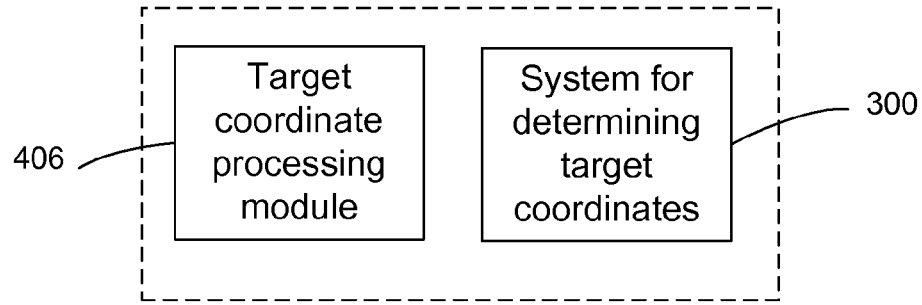
FIG. 4 shows schematically one example of a system for targeting.

FIG. 4 shows schematically a system 400 for targeting. The system 400 comprises a system 300 for determining target coordinates 300. The system for determining target coordinates is described in relation to FIG. 3. The system 400 further comprises target coordinate processing module 406. The target coordinate processing module 406 is arranged to receive the target coordinates from the system for determining target coordinates 300. In one example, target coordinate processing module 406 is arranged to receive information related to the evaluation of the target coordinates from the system for determining target coordinates 300. The target coordinate processing module 406 is further arranged to use the target coordinates as input for a call-for-fire procedure.

FIGS. 5a-5c illustrates schematically measurement of a reference object. In FIGS. 5a-5c, the reference object is selected as the upper corner 584 of one window of a building 580. The reference object 584 is associated to a geo-referenced coordinate as provided from a 3D map. A range and direction measuring device 502 is arranged to measure range and direction to the reference object, i.e. the window corner 584. The range and direction measuring device 502 is in the illustrated example mounted on a stand 507.

In FIG. 5a, the reference object, window corner 584, is viewed from the position of the range and direction measuring device 502.

FIG. 5b, shows a side view of the range and direction measuring device 502 and the reference object 584. The range and direction measuring device 502 measures a range to the reference object 584. The range and direction measuring device 502 further measures an elevation angle 581 between a ground plane 586 and a line 583a between the range and direction measuring device and the reference object 584.

FIG. 5c shows a view from above of the range and direction measuring device 502 and the reference object 584. The range and direction measuring device 502 measures the range to the reference object 584. The range and direction measuring device 502 further measures an azimuth angle 581 between a reference direction 587, in the illustrated example north, and a line 583b between the range and direction measuring device and the reference object 584.

Thus, in the illustrated example, for each reference object, there is provided a geo-referenced position, a range, an elevation angle and an azimuth angle.

FIGS. 6a-6b illustrate schematically measurement of a reference object and measurement of a target. In FIGS. 6a-6b, the reference object is selected as the upper corner 684 of one window of a building 680. The reference object is associated to a geo-referenced coordinate as provided from a 3D map. A range and direction measuring device 602 is arranged to measure range and direction to the reference object, i.e. the window corner 684. The range and direction measuring device 602 is in the illustrated example mounted on a stand 607.

FIG. 6*a*, shows a side view of the range and direction measuring device 602 and the reference object 684. The range and direction measuring device 602 measures a range to the reference object 684. The range and direction measuring device 602 further measures an elevation angle 681 between a ground plane 686 and a line 683*a* between the range and direction measuring device and the reference object 684.

The range and direction measuring device 602 further measures a range to a target 690. The range and direction measuring device 602 further measures an elevation angle 691 between the ground plane 686 and a line 693*a* between the range and direction measuring device and the target 690.

FIG. 6*b* shows a view from above of the range and direction measuring device 602 and the reference object 684. The range and direction measuring device 602 measures the range to the reference object 584. The range and direction measuring device 602 further measures an azimuth angle 681 between a reference direction 687, in the illustrated example north, and a line 683*b* between the range and direction measuring device and the reference object 684.

The range and direction measuring device 602 further measures an azimuth angle 695 between the reference direction 687, in the illustrated example north, and a line 693*b* between the range and direction measuring device and the target 690.

Thus, in the illustrated example, there is provided for the target a geo-referenced position, a range, an elevation angle and an azimuth angle.

Figure 7A:
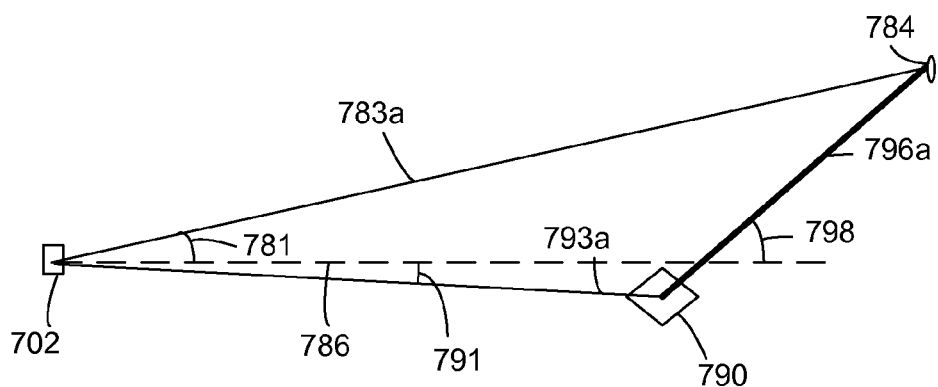
FIG. 7 shows schematically one example of calculation of target position.
Figure 7B:
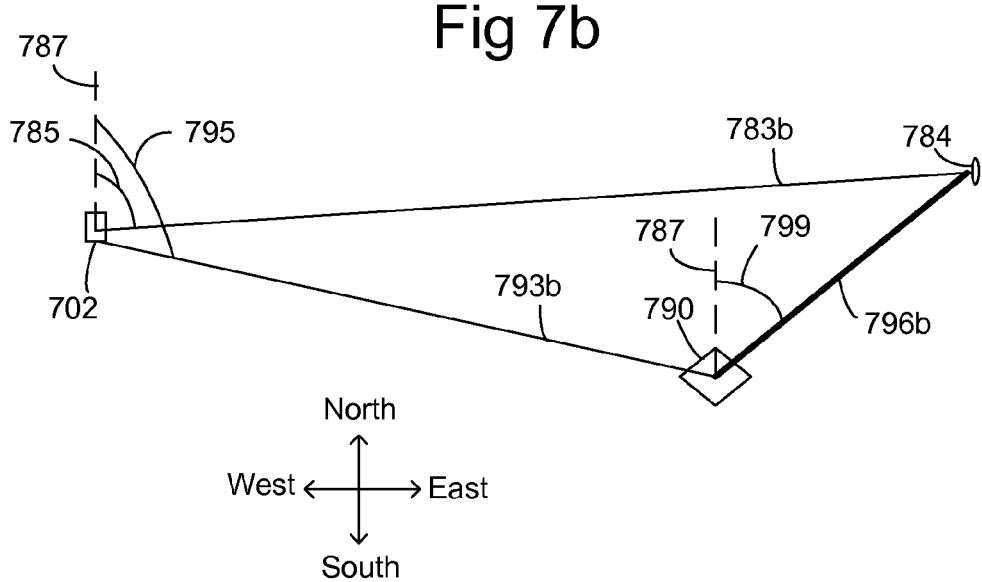

FIGS. 7*a*-7*b* illustrate schematically one example of calculation of target position. In FIGS. 7*a*-7*b*, the reference object 784 is associated to a geo-referenced coordinate as provided from a 3D map. A range and direction measuring device 702 is arranged to measure range and direction to the reference object 784.

FIG. 7*a*, shows a side view of the range and direction measuring device 702 and the reference object 784. There is a range between the range and direction measuring device 702 and the reference object 784. An elevation angle 781 exists between a ground plane 786 and a line 783*a* between the range and direction measuring device and the reference object 784.

Further, there is a range between the range and direction measuring device 702 and the target 790. Further, an elevation angle 691 exists between the ground plane 786 and a line 793*a* between the range and direction measuring device 702 and the target 790.

Further, there is a range between the reference object 784 and the target 790. An elevation angle 798 exists between the ground plane 786 and a line 796*a* between the reference object and the target.

FIG. 7*b* shows a view from above of the range and direction measuring device 702 and the reference object 784. There is a range between the range and direction measuring device and the reference object 784. There is an azimuth angle 781 between a reference direction 787, in the illustrated example north, and a line 783*b* between the range and direction measuring device and the reference object 784.

Further, there is an azimuth angle 795 between the reference direction 787, in the illustrated example north, and a line 793*b* between the range and direction measuring device and the target 790.

An azimuth angle 799 exists between a reference direction 787, in the illustrated example north, and a horizontal line 796*b* between the reference object and the target.

Thus, the range between the respective reference object and the target is represented by the length of a vector between the respective object and the target in the above described two planes. The direction of the vector is the direction of the vector in the above described two planes.

The invention claimed is:

1. A method for determining the position of a target, the method comprising the steps of:
   measuring, with a range and direction measuring device, the relative position of at least one reference object in relation to the range and direction measuring device;
   marking the at least one reference object in a geo-referenced three-dimensional map so as to obtain a geo-referenced coordinate within the geo-referenced three-dimensional map that is associated with the at least one reference object, whereby the geo-referenced coordinate associated with the at least one reference object is obtained from the geo-referenced three-dimensional map;
   measuring, with the range and direction measuring device, the relative position of a target in relation to the range and direction measuring device; and
   calculating a geo-referenced position of the target based on the measured relative position of the at least one reference object in relation to the range and direction measuring device, based on the measured relative position of the target in relation to the position of the range and direction measuring device, and based on the obtained geo-referenced coordinate of the at least one reference object.

2. The method according to claim 1, where the range and direction measuring device comprises a laser range finder.

3. The method according to claim 1, wherein the obtained geo-referenced coordinate of the at least one reference object and the calculated geo-referenced position of the target are three-dimensional positions.

4. The method according to claim 1, the method further comprising the step of preparing a call-for-fire message based on the calculated geo-referenced position of the target.

5. A system for determining the position of a target, the system comprising:
   a three-dimensional (3D) map presentation and marking device configured to present a geo-referenced three-dimensional map to a user, the 3D map presentation and marking device further being configured to receive a user input and to determine a geo-referenced coordinate within the geo-referenced three-dimensional map that is associated with at least one marked reference object, whereby the geo-referenced coordinate associated with the at least one marked reference object is obtained from the geo-referenced three-dimensional map and based on the user input;
   a range and direction measuring device configured to measure a relative position of the at least one marked reference object in relation to the range and direction measuring device and a relative position of a target in relation to the range and direction measuring device; and
   a target position determining unit configured to receive the geo-referenced coordinate associated with the at least one marked reference object from the 3D map presentation and marking device and configured to receive the relative position of the at least one marked reference object in relation to the range and direction measuring device and the relative position of the target in relation to the range and direction measuring device, and having a processor configured to determine a geo-referenced position of the target based on the received geo-referenced coordinate associated with the at least one marked reference object and the received relative position of the at least one marked reference object in relation to the range and direction measuring device and the received relative position of the target in relation to the range and direction measuring device.

6. The system according to claim 5, where the range and direction measuring device comprises a laser range finder.

7. The system according to claim 5, where the range and direction measuring device is arranged to determine at least two angles between an object and the range and direction measuring device.

8. The targeting system according to claim 5, wherein the target position determining unit is further
configured to transfer the determined geo-referenced position of the target.

9. An apparatus for determining the position of a target, said apparatus comprising:
a processor and a memory, said memory containing instructions executable by said processor whereby said apparatus is operative for:
measuring, with a range and direction measuring device, the relative position of at least one reference object in relation to the range and direction measuring device;
marking the at least one reference object in a geo-referenced three-dimensional map so as to obtain a geo-referenced coordinate within the geo-referenced three-dimensional map that is associated with the at least one reference object, whereby the geo-referenced coordinate associated with the at least one reference object is obtained from the geo-referenced three-dimensional map;
measuring, with the range and direction measuring device, the relative position of a target in relation to the range and direction measuring device; and
calculating a geo-referenced position of the target based on measured the relative position of at least one reference object in relation to the range and direction measuring device, based on the measured relative position of the target in relation to the range and direction measuring device, and based on the geo-referenced coordinate associated with the at least one reference object.

10. The method according to claim 1, wherein the geo-referenced coordinate associated with the at least one reference object is an Earth-based coordinate.

11. The method according to claim 1, wherein a geo-referenced position of the range and direction measuring device is initially unknown.

12. The system according to claim 5, wherein the geo-referenced coordinate associated with the at least one reference object is an Earth-based coordinate.

13. The system according to claim 5, wherein a geo-referenced position of the range and direction measuring device is initially unknown.

14. The apparatus according to claim 9, wherein the geo-referenced coordinate associated with the at least one reference object is an Earth-based coordinate.

15. The apparatus according to claim 9, wherein a geo-referenced position of the range and direction measuring device is initially unknown.

* * * * *

UNITED STATES PATENT AND TRADEMARK OFFICE
CERTIFICATE OF CORRECTION

PATENT NO. : 9,689,673 B2  
APPLICATION NO. : 14/363629  
DATED : June 27, 2017  
INVENTOR(S) : Bejeryd et al.

Page 1 of 1

It is certified that error appears in the above-identified patent and that said Letters Patent is hereby corrected as shown below:

In the Claims

Column 10
Line 30, cancel "position of the"

Signed and Sealed this
Tenth Day of October, 2017

Joseph Matal
*Performing the Functions and Duties of the*
*Under Secretary of Commerce for Intellectual Property and*
*Director of the United States Patent and Trademark Office*